United States Patent [19]
Williams et al.

[11] Patent Number: 5,491,571
[45] Date of Patent: Feb. 13, 1996

[54] LIQUID CRYSTAL DISPLAY INCLUDING ELECTRODES AND DRIVER DEVICES INTEGRALLY FORMED IN MONOCRYSTALLINE SEMICONDUCTOR LAYER

[75] Inventors: Ronald L. Williams, San Marcos; Ogden J. Marsh, Carlsbad; Steven E. Shields, San Diego, all of Calif.

[73] Assignee: Hughes Aircraft Company, Los Angeles, Calif.

[21] Appl. No.: 6,211

[22] Filed: Jan. 19, 1993

[51] Int. Cl.⁶ ........................ G02F 1/136; G02F 1/1339; H01L 27/12
[52] U.S. Cl. .................. 359/59; 359/80; 359/81; 359/88; 257/350
[58] Field of Search ................. 359/58, 59, 80, 359/74, 81, 82, 88; 257/347, 350, 351, 69, 72; 345/92, 98

[56] References Cited

U.S. PATENT DOCUMENTS

| | | | |
|---|---|---|---|
| Re. 28,891 | 7/1976 | Borel et al. | 359/59 |
| 3,765,747 | 10/1973 | Pankratz et al. | 359/58 |
| 3,861,783 | 1/1975 | Dill et al. | 359/81 |
| 3,862,360 | 12/1975 | Dill et al. | 178/7.3 D |
| 4,239,346 | 12/1980 | Lloyd | 350/334 |
| 4,422,731 | 12/1983 | Droquet et al. | 359/80 |
| 4,668,366 | 5/1987 | Zarowin | 204/192.1 |
| 5,056,895 | 10/1991 | Kahn | 359/87 |
| 5,189,500 | 2/1993 | Kusunoki | 359/72 |
| 5,200,847 | 4/1993 | Mawatari et al. | 359/59 |
| 5,206,749 | 4/1993 | Zavracky et al. | 359/59 |
| 5,250,931 | 10/1993 | Misawa et al. | 359/59 |
| 5,317,433 | 5/1994 | Miyawaki et al. | 359/74 |
| 5,377,031 | 12/1994 | Vu et al. | 359/59 |
| 5,444,557 | 8/1995 | Spitzer et al. | 359/59 |

FOREIGN PATENT DOCUMENTS

| | | |
|---|---|---|
| 0474474 | 3/1992 | European Pat. Off. . |
| 0486318 | 5/1992 | European Pat. Off. . |
| 04116624 | 4/1992 | Japan . |

Primary Examiner—William L. Sikes
Assistant Examiner—Tai Duong
Attorney, Agent, or Firm—M. E. Lachman; M. W. Sales; W. K. Denson-Low

[57] ABSTRACT

A silicon dioxide etch stop layer (30) is formed on an inner surface (28b) of a monocrystalline silicon layer (28), and a silicon carrier wafer (52) is bonded to the etch stop layer. The exposed inner surface (28a) of the monocrystalline layer (28) is uniformly thinned to approximately 4 micrometers. Front electrodes (20) in the form of heavily doped areas, and microelectronic transistor driver devices (42) for the electrodes (20) are integrally formed on the outer surface (28a) of the monocrystalline layer (28). A front plate (12) is bonded to the outer surface (28a) of the monocrystalline layer (28), and the carrier (52) is removed. The central portion of the etch stop layer (30) is removed from the inner surface (28b) of the monocrystalline layer (28), and the exposed central portion (28c) of the layer (28) is uniformly thinned to approximately 400 angstroms using plasma assisted chemical etching. A back plate (14) having a back electrode (16) formed thereon is adhered to the unetched peripheral portion (28d) of the inner surface (28b) of the monocrystalline layer (28) to define a sealed space (24) between the front and back electrodes (12,14) which is filled with liquid crystal material (26). Large scale integrated driver circuitry (38,40) is fabricated in the peripheral portion (28d) of the layer (28) laterally external of the back plate (14) and externally interconnected by via holes (28g,28h) and wirebonds (44,45).

13 Claims, 5 Drawing Sheets

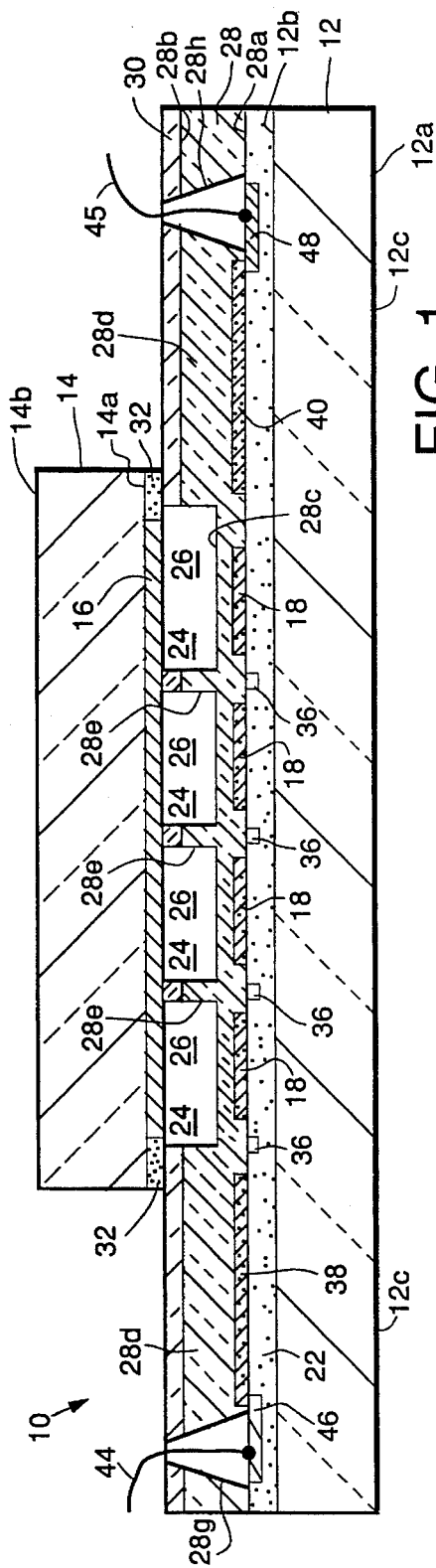
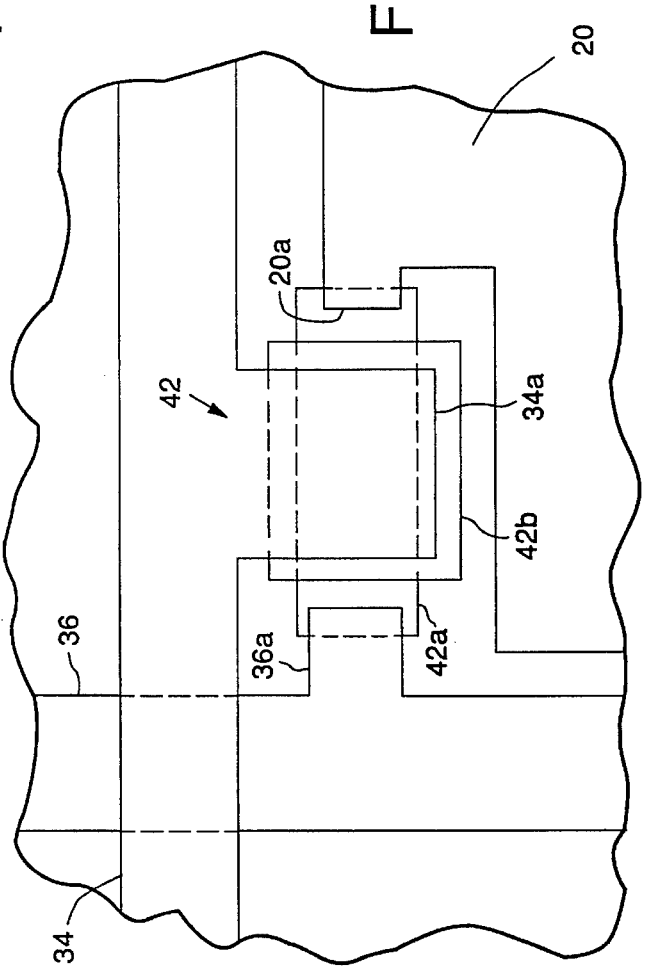
FIG. 1.
FIG. 4.

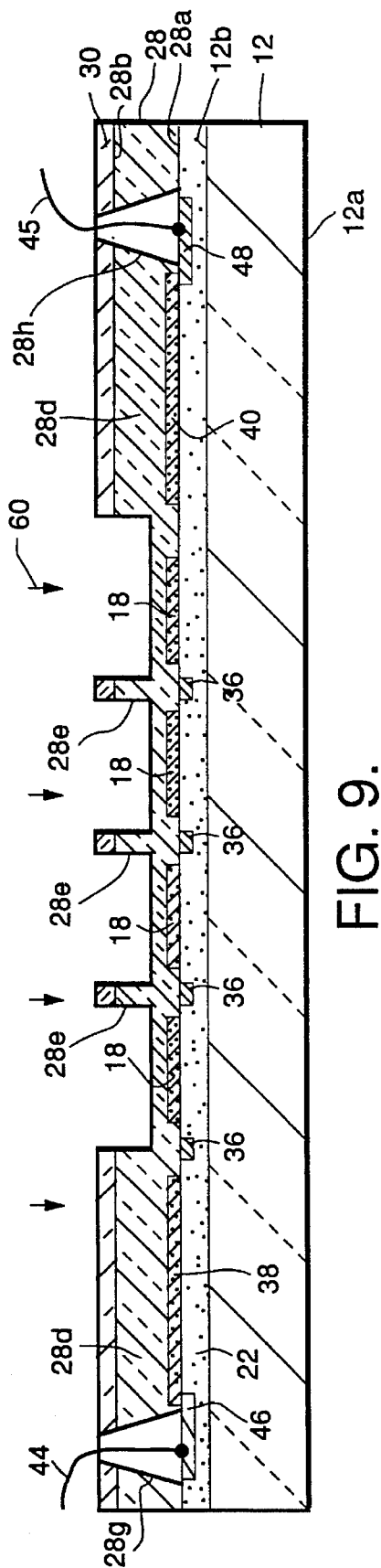
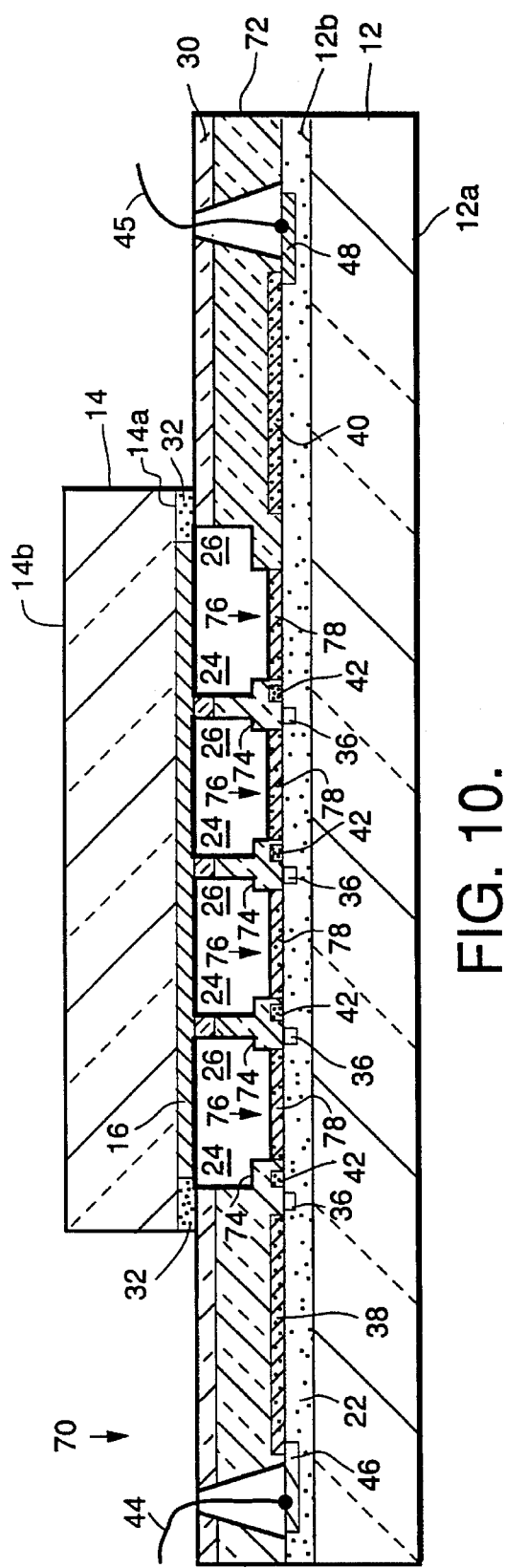
FIG. 9.
FIG. 10.

LIQUID CRYSTAL DISPLAY INCLUDING ELECTRODES AND DRIVER DEVICES INTEGRALLY FORMED IN MONOCRYSTALLINE SEMICONDUCTOR LAYER

BACKGROUND OF THE INVENTION

1. Field of the Invention

The present invention generally relates to the field of liquid crystal devices, and more specifically to a high speed liquid crystal display and fabrication method in which electrodes and microelectronic electrode driver devices are integrally formed in a transparent monocrystalline silicon semiconductor layer.

2. Description of the Related Art

A liquid crystal display includes a sealed space which is filled with a liquid crystal material. Front and back electrodes are disposed on opposite sides of the space and are selectively energized to apply electric fields to the liquid crystal material to cause it to locally change its orientation resulting in a spatially variant perturbation of the light passing through. The electrodes also provide charge storage for the cell.

Different liquid crystal materials affect light passing through by different mechanisms, such as variable birefringence, scattering, etc. The display may provide only discrete black and white levels, or a continuous gray scale.

Liquid crystal displays can have either transmissive or reflective configurations. The front electrodes can be arranged in segments to provide an alphanumeric display for a calculator or clock, or in a rectangular matrix to provide a continuous graphic image for television, computer and other applications.

U.S. Pat. No. 4,239,346, entitled "COMPACT LIQUID CRYSTAL DISPLAY SYSTEM" issued Dec. 16, 1980 to R. Lloyd discloses a reflective Active-Matrix Liquid-Crystal Display (AMLCD) including a transparent front electrode and electrode back plates formed of single crystal silicon which define a sealed space therebetween which is filled with liquid crystal material. A common front electrode is formed on the inner surface of the front plate, whereas a semiconductor layer includes the inner surface of the back plate.

Back electrodes of reflective metal are formed in a rectangular matrix pattern on the top surface of the semiconductor layer in contact with the liquid crystal. MOSFET electrode driver transistors, interconnected by polycrystalline silicon bus lines, are also formed in the semiconductor layer, and are operatively connected to the electrodes. Electrical potentials are selectively applied between the individual back electrodes and the front electrode via the bus lines and driver transistors to locally polarize the liquid crystal material and form an image complete with gray scale.

The preferred material for the front and back plates is glass, due to its negligible reactivity with liquid crystal materials, low cost and transparency, allowing either reflective or transmissive liquid crystal effects to be used. Although epitaxial deposition of monocrystalline (single crystalline or bulk) silicon is possible on various materials such as sapphire, the temperature required for deposition is on the order of 1,000° C. which is far in excess of the melting point of glass. In addition, the atomic structure of glass is highly irregular, and nonconducive to the growth of an epitaxial silicon layer.

For these reasons, the silicon layer on the front plate of Lloyd's display is formed by a standard silicon wafer. Alternative displays have used silicon layers formed by chemical vapor deposition (CVD) of amorphous or polycrystalline silicon. CVD of these materials can be performed at low temperatures and is not adversely affected by the irregular crystalline structure of the glass material of the plate.

However, the carrier mobility of polycrystalline silicon is one-eighth that of monocrystalline silicon, and the mobility of amorphous silicon is one-hundredth that of monocrystalline silicon. The operating speed of a microelectronic device is linearly proportional to the mobility. The low mobility of polycrystalline and amorphous silicon limits the operating speed of the electrode driver transistors and thereby the displays in which they are incorporated. These devices generally operate at less than 60 Hz, which is a common video display speed. In order to accommodate the leakage current and refresh time of transistors fabricated in polysilicon for 60 Hz operation, two transistors are connected in series to obtain sufficiently high impedance and low current.

SUMMARY OF THE INVENTION

In accordance with the present invention, a silicon dioxide etch stop layer is formed on an inner surface of a monocrystalline silicon layer, and a silicon carrier wafer is bonded to the etch stop layer. The exposed outer surface of the monocrystalline layer is uniformly thinned to approximately 4±0.01 micrometers using Plasma Assisted Chemical Etching (PACE) to obtain the flatness required for subsequent proccessing.

Front electrodes in the form of heavily doped areas, and transistor drivers for the electrodes are integrally formed on the outer surface of the monocrystalline layer. A front glass plate is bonded with a transparent adhesive to the outer surface of the monocrystalline layer, and the carrier wafer is removed.

The central portion of the etch stop layer is removed from the inner surface of the monocrystalline layer, and the exposed central portion of the monocrystalline layer is thinned to a uniform thickness of approximately 400 angstroms using plasma assisted chemical etching. A back plate having a back electrode formed thereon is adhered to the unetched peripheral portion of the inner surface of the monocrystalline layer to define a sealed space between the front and back electrodes which is filled with liquid crystal material. Large scale integrated driver circuitry is fabricated in the peripheral portion of the semiconductor layer laterally external of the back plate and externally interconnected by via holes and wirebonds.

The electrode driver transistors which are formed in the present monocrystalline silicon layer have much higher carrier mobility than comparable transistors formed in polycrystalline and amorphous silicon as described above. The higher mobility enables higher current per junction area, allowing the size of the transistors to be reduced and provide an increase in resolution and fill factor (ratio of active area to total area of display).

In addition, the front electrodes may be composed of highly doped areas of the thinned, monocrystalline silicon layer. This provides the present display with improved reliability and ease of fabrication.

These and other features and advantages of the present invention will be apparent to those skilled in the art from the following detailed description, taken together with the

DESCRIPTION OF THE DRAWINGS

FIG. 1 is a simplified sectional view illustrating a liquid crystal display embodying the present invention;

FIG. 4 is a diagram illustrating the arrangement of a single electrode driver transistor of the display;

FIGS. 5 to 9 are simplified sectional views illustrating the method of fabricating the present display; and FIG. 10 is a simplified sectional view illustrating a modified embodiment of the present display.

DETAILED DESCRIPTION OF THE INVENTION

Figure 2:
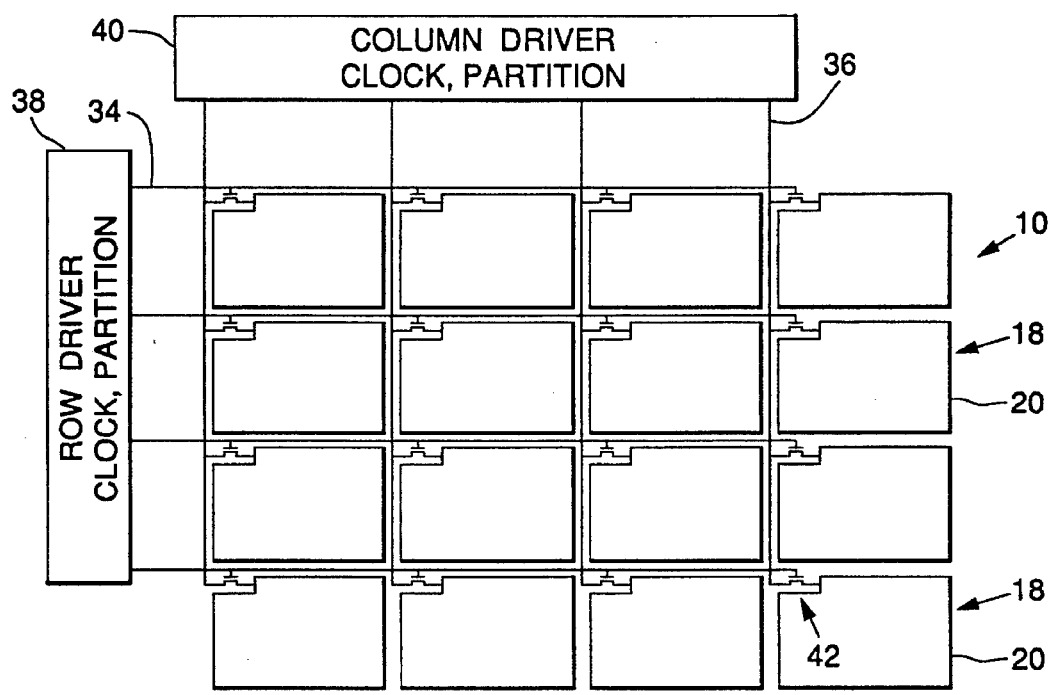
FIG. 2 is a diagram illustrating the arrangement of front electrodes, electrode driver transistors and bus lines of the display.
Figure 3:
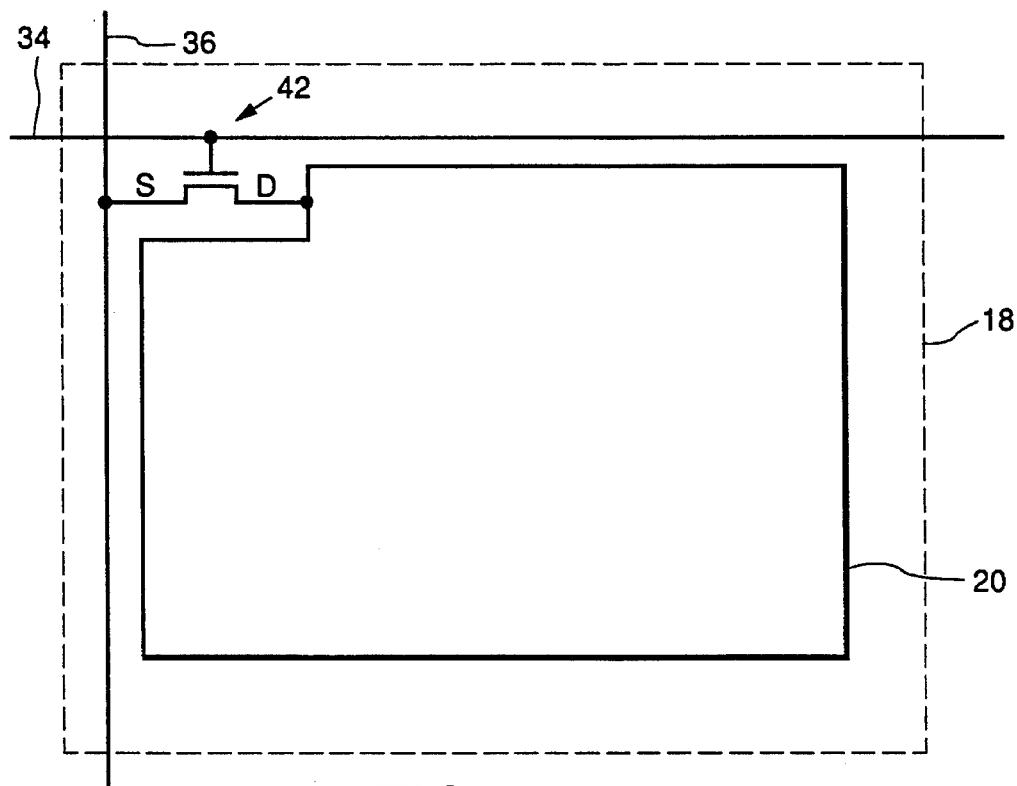
FIG. 3 is a diagram illustrating a unit cell of the display at enlarged scale.

As illustrated in FIGS. 1 to 3, a liquid crystal display 10 embodying the present invention includes a glass front plate 12 (which faces a viewer) having a front or outer surface 12a and back or inner surface 12b, and a glass back plate 14 having a front or inner surface 14a and back or outer surface 14b. A back electrode 16 is formed on the inner surface 14a of the back plate 14, whereas a plurality of unit cells 18 including transparent front electrodes 20 are adhered to the inner surface 12b of the front plate 12 by a transparent adhesive 22 such as epoxy.

The plates 12 and 14 are sandwiched together with a predetermined spacing therebetween, and sealed at their peripheral edges to define a sealed space 24 therebetween which is filled with a liquid crystal material 26. The display 10 can be transmissive, in which case the plate 14 and back electrode 16 are transparent. Alternatively, a reflective display can be provided by making the electrodes 20 reflective, and viewing the display through the transparent back electrode 16.

The back electrode 16 and cells 18 can be arranged in any desired configuration within the scope of the invention. In the preferred configuration as illustrated in FIG. 2, the cells 18 are arranged in a rectangular grid array to form an Active-Matrix Liquid-Crystal Display (AMLCD). Alternatively, although not illustrated, the electrodes can be arranged as segments which are selectively switched to form numerals or alphanumeric characters, or as an array of rectangular plates not ordered in rows and columns, but in other patterns, such as the bricks in a brick wall might be ordered, for example.

The electrodes 20 are individually and selectively switched to a range of voltages such that the electric field between the electrodes 20 and the electrode 16 causes the local orientation of the liquid crystal material 26 to switch continuously between two discrete states. In the case of birefringent liquid crystal materials, one or more polarizer plates (not shown) are provided for polarizing light passing through the material 26 such that the material 26 appears light or dark in response to the applied field.

In accordance with the invention, a monocrystalline (single crystalline or bulk) semiconductor layer 28 is sandwiched between the plates 12 and 14 and has a front or outer surface 28a and back or inner surface 28b. The preferred material for the semiconductor layer 28 is silicon, although other semiconductor materials such as gallium arsenide, cadmium selenide or cadmium telluride can be used within the scope of the invention.

The outer surface 28a of the semiconductor layer 28 is adhered to the inner surface 12b of the front plate 12 by the adhesive 22. The inner surface 28b of the layer 28 has a thinned central portion 28c and a thick peripheral portion 28d which constitutes a continuous protrusion extending toward the back plate 14. An insulating layer 30, such as silicon dioxide layer or silicon nitride, is formed on the peripheral portion 28d which is sealingly adhered to the inner surface 14a of the back plate 14 by an adhesive 32.

The peripheral portion 28d acts as a peripheral seal such that the space 24 is defined between the central and peripheral portions 28c,28d of the inner surface 28b of the semiconductor layer 28 and the inner surface 14a of the back plate 14 (with the back electrode 16 formed thereon), with the liquid crystal material 24 being disposed between the electrodes 16 and 20.

The peripheral portion 28d also constitutes a spacer, having a predetermined height which is selected such that the spacing between the inner surfaces 12b and 14a of the plates 12 and 14 respectively and the thickness of the space 24 will have predetermined selected values.

In order to further facilitate the spacing between the plates 12 and 14, protrusions 28e in the form of posts or walls which are laterally distributed on the inner surface 12b of the central portion 28c of the semiconductor layer 28 extend therefrom toward the back plate 14.

The height of the protrusions 28e is the same as the height of the peripheral portion 28d, such that the entire area of the back plate 14 is accurately spaced from the front plate 12. The protrusions 28e can be formed between adjacent cells 18, between groups of cells 18, or in any other desired configuration.

As illustrated in FIG. 2, the unit cells 18 are arranged in a rectangular matrix configuration. Sixteen cells 18 (one cell 18 is illustrated in FIG. 3) are arranged in a 4×4 matrix. The number of cells 18 is not limited within the scope of the invention. A practical display might include, for example, 262,144 unit cells arranged in a 512×512 matrix.

The display 10 as viewed in FIG. 2 includes four row select bus lines 34 and four column select bus lines 36 which are formed on the outer surface 28a of the semiconductor layer 28. The lines 34 and 36 may be aluminum or other suitable metallizations as illustrated, or alternatively may be formed as electrically conductive lines in the material of the semiconductor layer 28.

An external row driver circuit 38 sequentially applies a select signal to the row select lines 34. A column driver circuit 40 applies signals to the column select lines 36 which designate the polarization states and the corresponding light transmission characteristics for the individual cells 18 in the selected row. In this manner, the rows are sequentially scanned to generate a pixelized graphic image.

In addition to including row and column drivers per se, the driver circuits 38 and 40 are preferably large scale integrated circuits which provide clock, partitioning, housekeeping and other functions. This enables substantially all of the microelectronic circuitry for the display 10 as well as the driver transistors 42 and electrodes 20 to be integrally fabricated in the outer surface 28a of the semiconductor layer 28.

As illustrated in FIG. 3, an exemplary row select line 34 is connected to the gate of a microelectronic thin film MOSFET electrode driver device transistor 42 of the respective cell 18, whereas the column select line 36 is connected to the source of the transistor 42. The drain of the transistor 42 is connected to the electrode 20. Although not illustrated, a storage capacitor may be provided which is connected to the drain of the transistor 42. This electrical layout is well known, having being described in an article entitled "LIQUID CRYSTAL MATRIX DISPLAYS" by Lechner et al, in Proceedings of the IEEE, Vol. 59, No. 11, Nov. 1971, pp. 1566–1579, as well as in U.S. Pat. No. 3,862,360, entitled "LIQUID CRYSTAL DISPLAY SYSTEM WITH INTEGRATED SIGNAL STORAGE CIRCUITRY" issued Jan. 21, 1975 to H. Dill et al.

The row select signal turns on the transistor 42, which gates the column select signal from the source to the drain and thereby to the electrode 20. The column select signal assumes a variable value in proportion to the gray level to be displayed which causes the electrodes 16 and 20 to create a local electric field therebetween. This field polarizes the liquid crystal material 26 to a corresponding state in which it affects the transmitted light in accordance with the value of the column select signal.

The electrodes 20 are preferably formed as respective areas in the front surface 28a of the semiconductor layer 28 which are highly doped to a level of electrical conductivity. It is, however, within the scope of the invention to chemically deposit the electrodes 20 on the surface 28a.

The electrode driver transistors 42 are also formed in the front surface 28a of the semiconductor layer 28 as thin film enhancement MOSFETs or other types of transistor devices to constitute an integral microelectronic structure with the electrodes 20 and select lines 34 and 36. An exemplary configuration of the transistor 42 is illustrated in FIG. 4, and includes a channel 42a which is doped to N or P conductivity type by a suitable process such as ion implantation.

An insulative gate oxide layer 42b is deposited over the channel 42a. A tab 34a extends from the row select line 34 over the oxide layer 42b to constitute the gate of the transistor 42. A tab 36a extends from the column select line 36 over the left end (as viewed in FIG. 4) of the channel 42a and is electronically interconnected with it to constitute the source. A tab 20a extends from the electrode 20 over the right end of the channel 42a and is similarly electrically interconnected to constitute the drain.

As further illustrated in FIG. 1, the front plate 12 further has a peripheral portion 12c which extends laterally external of the back plate 14. The peripheral portion 28d of the semiconductor layer 28 extends over and is adhered to the peripheral portion 12c of the front plate 12.

In accordance with the invention, the row driver circuit 38 and the column driver circuit 40 are fabricated as microelectronic circuits in the outer surface 28a in the peripheral portion 28d of the semiconductor layer. The circuits 38 and 40 are fabricated at the same time as and using the same silicon processing technology as the unit cells 18.

Vertical interconnect (VIA) holes 28g and 28h are formed through the insulating layer 30 and the peripheral portion 28d of the semiconductor layer 28 and open onto bonding pads 46 and 48 which are formed on the outer surface 28a of the semiconductor layer 28. The bonding pads 46 and 48, although not explicitly illustrated, are interconnected to the circuits 38 and 40 respectively. Although only two vias and bonding pads are shown for simplicity of illustration, in practical application a large number of vias and bonding pads will be provided.

External connection to the bonding pads 46 and 48 are made by wirebonds 44 and 45 respectively or other suitable conductors which extend into ohmic connection with the pads 46 and 48.

The electrode driver transistors 42 which are formed in the present monocrystalline silicon layer 28 have much higher carrier mobility than comparable transistors formed in polycrystalline and amorphous silicon or glass as in the prior art. The higher mobility enables higher current per junction area, allowing the size of the transistors to be reduced and provide an increase in resolution and fill factor (ratio of active area to total area of display).

The front electrodes 20 which are composed of highly doped areas of the thinned, central portion 28c of the monocrystalline silicon layer 28 provide the present display 10 with improved reliability and ease of fabrication. In addition, the electrodes 20, select lines 34 and 36 and transistors 42 are hermetically sealed by the plate 12 and adhesive 22, thereby protecting them from chemical reaction with the liquid crystal material 26.

Figure 5:
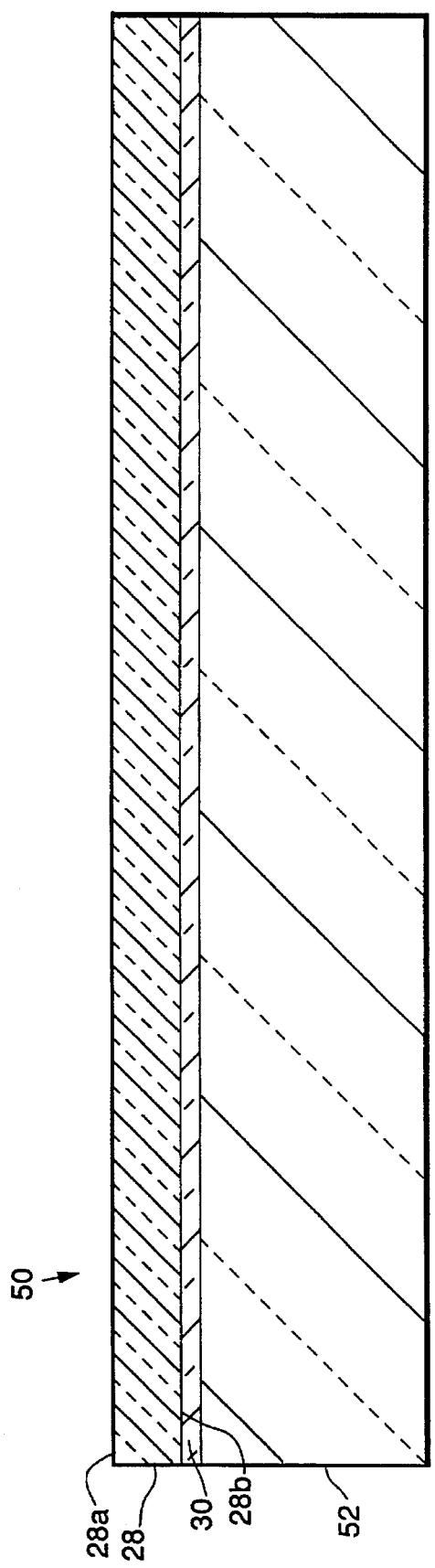

A method of fabricating the display 10 is illustrated in FIGS. 5 to 10. In FIG. 5, a bonded structure 50 is provided as including the monocrystalline silicon layer 28, with the silicon dioxide layer 30 formed on the inner surface 28b thereof. A sacrificial carrier wafer 52 is bonded to the oxide layer 30.

The monocrystalline silicon layer 28 has a thickness of 2–8 micrometers, chosen to optimize the electro-optical performance of the liquid crystal as is well known in the art. The carrier wafer 52 is preferably formed of silicon and has a thickness of 525 micrometers, making it sufficiently durable to support the monocrystalline silicon layer 28 through standard silicon processing steps. The silicon dioxide layer 30 is typically one micrometer thick.

The structure 50 is fabricated by initially providing the monocrystalline silicon layer 28 in the form of a wafer having a thickness on the order of that of the carrier wafer 52. The layer 28 is then oxidized to form the silicon dioxide layer 30. The wafers are then pressed together with or without the intermediary of an adhesive, and the semiconductor layer 28 is thinned from the outer surface 28a thereof to the desired thickness.

The preferred method of thinning the monocrystalline silicon layer 28 is Plasma Assisted Chemical Etching (PACE) as disclosed in U.S. Pat. No. 4,668,366, entitled "OPTICAL FIGURING BY PLASMA ASSISTED CHEMICAL TRANSPORT AND ETCHING APPARATUS THEREFOR", issued May 26, 1987 to C. Zarowin, which enables the outer surface 28a to be planarized and the thickness of the layer 28 to be made highly uniform. Structures 50 which are suitable for practicing the present invention are commercially available from, for example, Shin-Etsu Handotai (SEH) of Tokyo, Japan. Preferably, the layer 28 is thinned to 4.0±0.01 micrometers using the PACE process to obtain the flatness required for subsequent processing.

Figure 6:
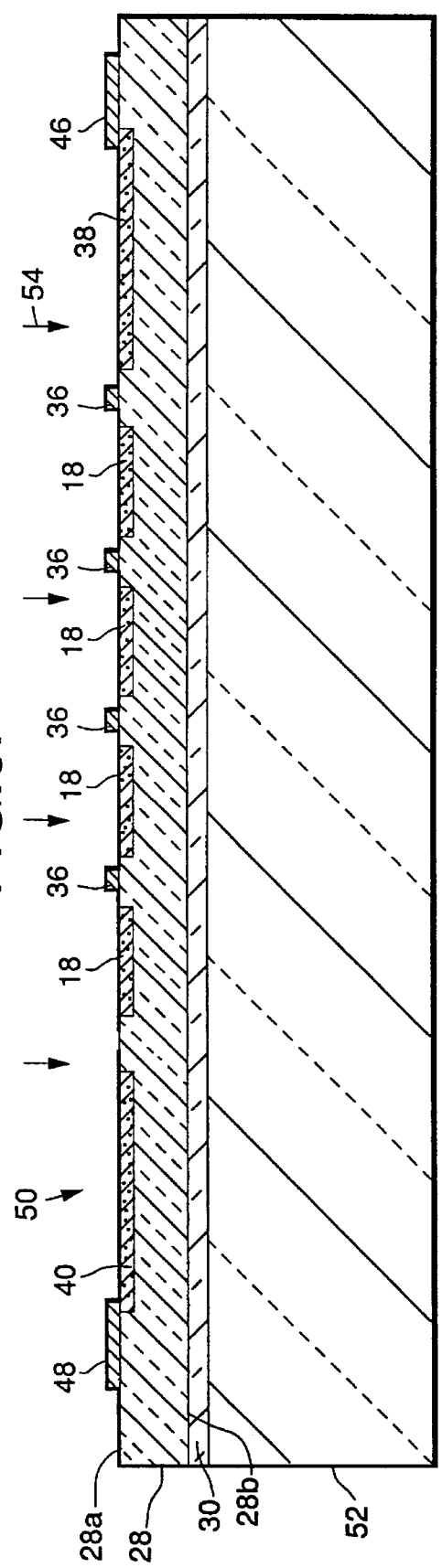

In the step of FIG. 6, the unit cells 18, driver circuits 38 and 40, select lines 34 and 36 and bonding pads 46 and 48 are formed in the front surface 28a of the layer 28 as indicated by arrows 54 using standard silicon processing technology. The step of FIG. 6 may include the formation of additional microelectronic devices or structures, such as light blocking shields for the transistors 42, although not explicitly illustrated.

Figure 7:
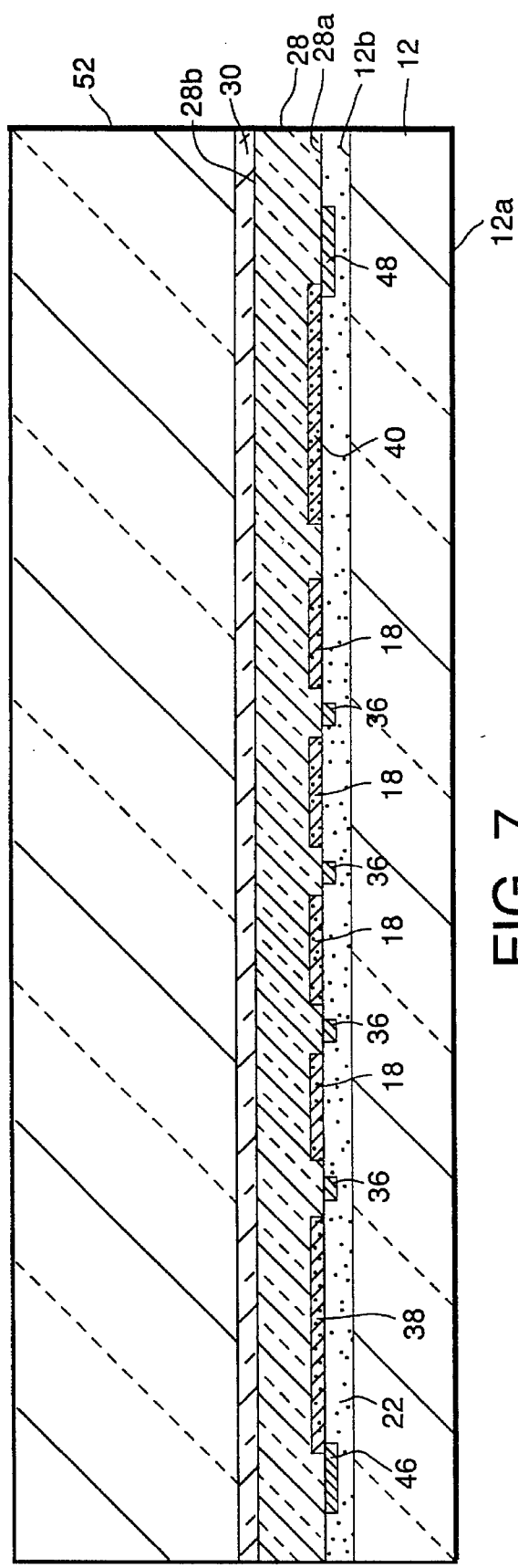

FIG. 7 illustrates how the structure 50 is inverted from the orientation of FIG. 6, and bonded to the front plate 12 using the adhesive 22.

Figure 8:
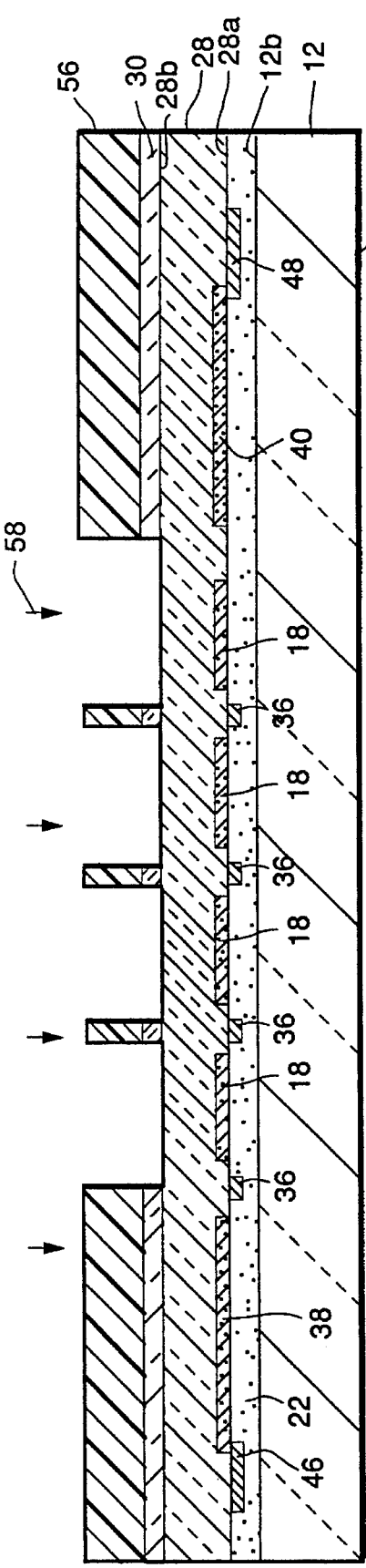

In FIG. 8, the carrier wafer 52 is removed using an etchant to which the insulating layer 30 (silicon dioxide or other insulating material) is resistant. The preferred etchant in the case of silicon dioxide is potassium hydroxide (KOH), with the layer 30 acting as a etch stop layer. A photoresist pattern layer 56 is formed on the periphery of the layer 30 and in the areas of the protrusions 28e using standard photolithographic techniques, and the central portion of the silicon dioxide layer 30 except in the areas of the protrusions 28e is etched away as indicated by arrows 58 to expose the silicon layer 28.

As illustrated in FIG. 9, the central portion 28c of the monocrystalline silicon layer 28 is thinned to approximately 300–600 angstroms, preferably approximately 400 angstroms, except in the areas of the protrusions 28e using the PACE process as indicated by arrows 60. The final thickness of the portion 28c depends on the desired color of the display 10. The via holes 28g and 28h are etched through the layers 28 and 30, and the wirebonds 44 and 45 are connected to the bonding pads 46 and 48 respectively.

The back plate 14 is then adhered to the peripheral portion 28d of the layer 28 as illustrated in FIG. 9, and the space 24 is filled with the liquid crystal material 26 to produce the display 10 as illustrated in FIG. 1. The silicon dioxide layer 30 may be removed prior to assembly of the back plate 14, or may remain as shown.

FIG. 10 illustrates a modified liquid crystal display 70 embodying the present invention in which the monocrystalline silicon layer is designated as 72. In the display 70, a photoresist pattern (not shown) is formed on the layer 72, and portions of the layer 72 are etched away completely in the step of FIG. 9 to produce islands 74 on which the driver transistors 42 and select lines 34 and 36 are formed, and openings 76 between the islands 74.

Transparent electrodes 78 are formed on the inner surface 12b of the plate 12 by deposition of ITO in the openings 76 and operatively connected to the transistors 42. The display 70 is desirable in an application in which the ITO electrodes 78 can be made more transmissive than the doped silicon electrodes 20.

While several illustrative embodiments of the invention have been shown and described, numerous variations and alternate embodiments will occur to those skilled in the art, without departing from the spirit and scope of the invention.

As one modification, the posts are left in the silicon layer 28 or 78, which help to support the top electrode 14a at a controlled spacing from the active matrix array. These spacers could be located in non-optically active regions of the display, such as between the electrodes 20, resulting in improved performance. Current displays use balls as spacers which are deposited randomly throughout the liquid crystal volume, and degrade the performance of the display by causing optical artifacts.

As another modification, the openings 76 might have several different thicknesses. This would permit the electrooptic performance of the liquid crystal to be optimized at several different light wavelengths, as is desired in a color display.

Accordingly, it is intended that the present invention not be limited solely to the specifically described illustrative embodiments. Various modifications are contemplated and can be made without departing from the spirit and scope of the invention as defined by the appended claims.

We claim:

1. A livid crystal display comprising:
    transparent first plate having an inner surface and an outer surface;
    a monocrystalline semiconductor layer having an inner surface and an outer surface, said outer surface of the semiconductor layer being transparently adhered to said inner surface of the first plate;
    a transparent first electrode which is adhered to said inner surface of the first plate;
    a microelectronic driver device which is formed on said outer surface of the semiconductor layer and operatively connected to the first electrode;
    a second plate having an inner surface and an outer surface;
    a second electrode formed on said inner surface of the second plate;
    spacer means for spacing said inner surfaces of the first and second plates from each other by a predetermining spacing;
    sealing means for providing a peripheral seal around the first and second plates to define a sealed space between the first and second electrodes; and
    a liquid crystal material provided in said space;
    said spacer means and sealing means in combination comprising a continuous peripheral protrusion which extends from said inner surface of the semiconductor layer toward said inner surface of the second plate and has a height corresponding to said predetermined spacing.

2. A display as in claim 1 in which said outer surface of the semiconductor layer is transparently adhered to said inner surface of the first plate with a layer of transparent adhesive.

3. A display as in claim 1, in which the first electrode comprises a heavily doped area formed in said outer surface of the semiconductor layer.

4. A display as in claim 1, in which the semiconductor layer comprises an island in which the driver device is formed.

5. A display as in claim 4, in which:
    the semiconductor layer has an opening that is formed through said layer, which is laterally spaced from said island; and
    the first electrode is adhered to said inner surface of the first plate in said opening.

6. A display as in claim 1, in which a central portion of the semiconductor layer which defines said space has a thickness of approximately 300–600 angstroms.

7. A display as in claim 1, in which the semiconductor is formed of silicon.

8. A display as in claim 1, in which the spacer means comprises a protrusion which extends from said inner surface of the semiconductor layer toward said inner surface of the second plate, and has a height corresponding to said predetermined spacing.

9. A display as in claim 1, in which the spacer means comprises a plurality of protrusions which are laterally distributed on said inner surface of the semiconductor layer and extend therefrom toward said inner surface of the second plate, said protrusions having a height corresponding to said predetermined spacing.

10. A liquid crystal display comprising:
    transparent first and second plates having inner and outer surfaces, said first plate laterally external of the second plate and has an inner surface;
    a monocrystalline semiconductor layer having an inner surface and an outer surface, said outer surface of the semiconductor layer being transparently adhered to said inner surface of the first plate, said semiconductor layer comprising a peripheral portion having an outer surface which is transparently adhered to said inner surface of said peripheral portion of the first plate;

a transparent first electrode which is adhered to said inner surface of the first plate;

a microelectronic driver device which is formed on said outer surface of the semiconductor layer and operatively connected to the first electrode;

a second electrode formed on said inner surface of the second plate;

microelectronic circuit means for controlling said driver device, the circuit means being formed on said outer surface of said peripheral portion of the semiconductor layer;

spacer means for spacing said inner surfaces of the first and second plates from each other by a predetermined spacing;

sealing means for providing a peripheral seal around the first and second plates to define a sealed space between the first and second electrodes; and a liquid crystal material provided in said space.

11. A display as in claim 10, further comprising vertical interconnect means extending through said peripheral portion of the semiconductor layer for interconnection with the circuit means.

12. A display as in claim 11, in which the vertical interconnect means comprises:

an opening formed through said peripheral portion of the semiconductor layer;

bonding pad means formed on said outer surface of said peripheral portion of the semiconductor layer; and conductor means extending through said opening into ohmic connection with the bonding pad means.

13. A display as in claim 12, in which the conductor means comprises a wirebond.

* * * * *